W. P. HAMMOND.
SPARE TIRE HOLDER.
APPLICATION FILED NOV. 26, 1915.
1,223,786. Patented Apr. 24, 1917.
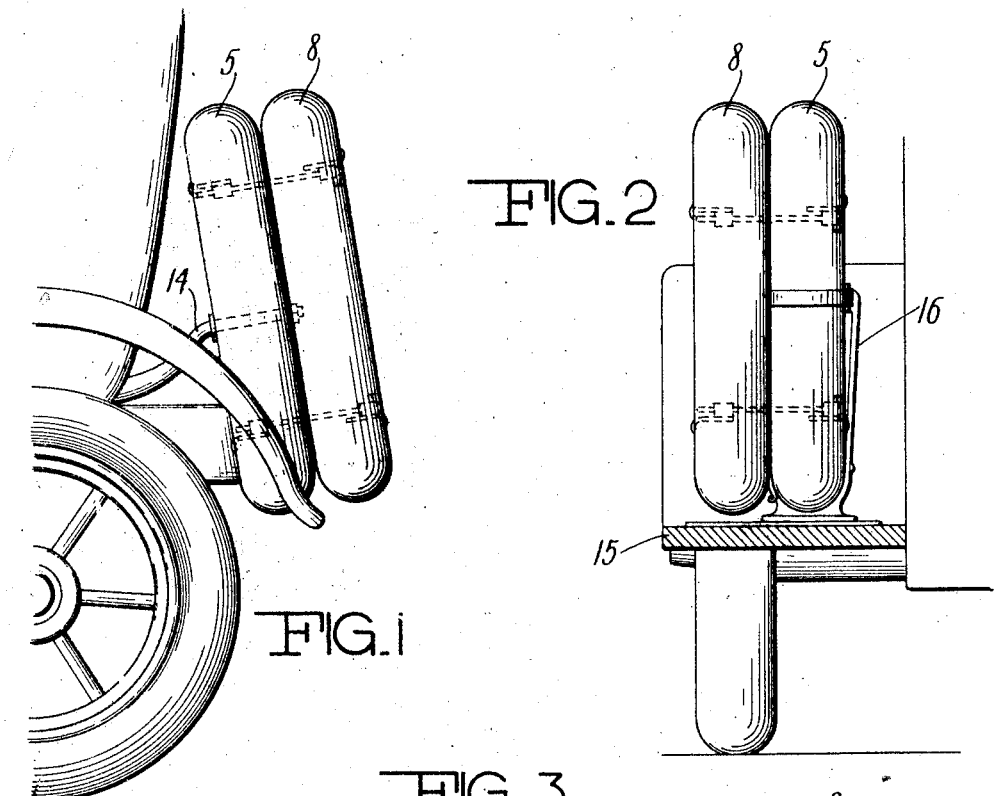
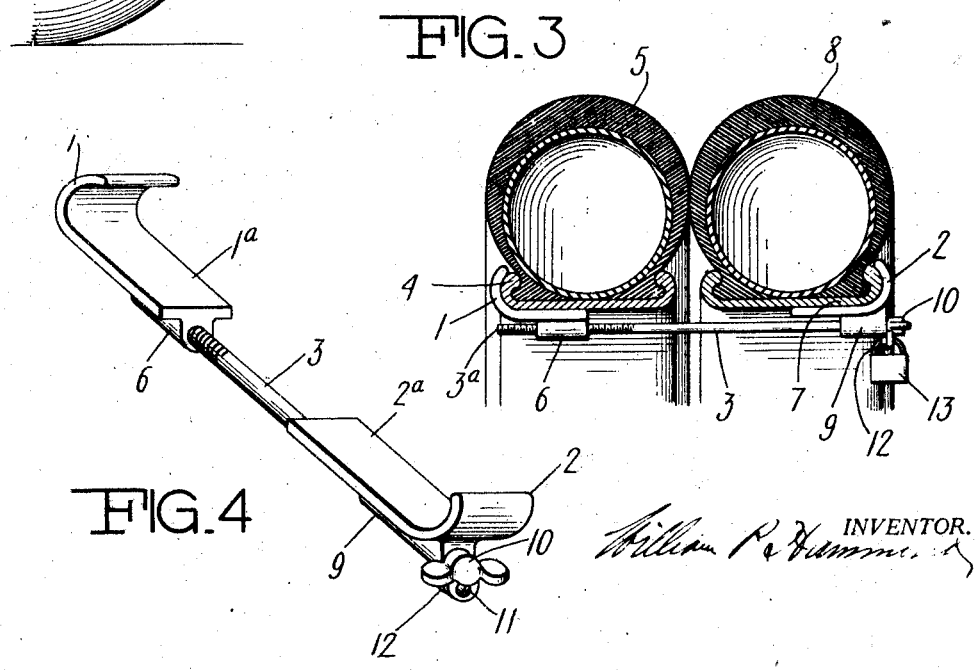
INVENTOR.
William P. Hammond

UNITED STATES PATENT OFFICE.

WILLIAM P. HAMMOND, OF PASSAIC, NEW JERSEY.

SPARE-TIRE HOLDER.

1,223,786.  Specification of Letters Patent.  Patented Apr. 24, 1917.

Application filed November 26, 1915. Serial No. 63,364.

*To all whom it may concern:*

Be it known that I, WILLIAM P. HAMMOND, a citizen of the United States, residing at Passaic, in the county of Passaic and State of New Jersey, have invented certain new and useful Improvements in Spare-Tire Holders, of which the following is a specification.

The present invention relates to certain new and useful improvements in spare tire holders for automobiles, and has for its object to provide a novel device by means of which a second spare tire can be readily secured to a first spare tire, thereby enabling a motorist to support two spare tires upon a tire holder constructed to receive but a single spare tire.

Further objects of the invention are to provide a device of this character which is comparatively simple and inexpensive in its construction, which admits of the second spare tire being readily mounted in position or removed therefrom, which can be easily carried in a tool box when there is no need for carrying a second spare tire, and which provides for locking the second tire in position so that it is secure against theft.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which I have illustrated one preferable embodiment of my invention.

Figure 1 is a fragmentary side elevation of the rear end of an automobile showing the device as employed for securing a second spare tire to a spare wheel carried at the rear of the automobile.

Fig. 2 is a transverse sectional view through the running board of an automobile, showing the invention as employed for securing a second spare tire to a first spare tire carried by the ordinary tire holder of the running board.

Fig. 3 is a transverse sectional view through a pair of tires mounted upon demountable rims, said tires being clamped together by the tire holder.

Fig. 4 is a detail perspective view of one of the clamping members constituting the tire holder.

Corresponding and like parts are referred to in the following description and indicated in all the views of the drawing by the same reference characters.

The ordinary tire holders with which automobiles are equipped are usually constructed to carry but a single tire, and the object of the present invention is to provide a novel clamping means for securing a second spare tire to the first spare tire, so that two spare tires can be readily carried without necessitating any change or alteration of the original tire holder. For this purpose a number of novel clamping members are utilized for securing the second spare tire to the rim of the first spare tire. Each of these clamping devices includes a pair of complemental claws 1 and 2 which are adjustably connected by the clamping bolt 3. The claw 1 is adapted to engage the rim 4 of the first spare tire 5 and is constructed with a shank 1ª which fits squarely against the inner surface of the rim 4 so as to obtain a firm bearing thereon. An internally threaded sleeve 6 which is preferably integral with the shank 1ª projects from the back of the shank at the end thereof, and is longitudinally disposed upon the shank so as to receive the threaded end 3ª of the clamping bolt 3. The opposite clamping claw 2 is somewhat similar in construction to the claw 1, being adapted to engage the rim 7 of the second spare tire 8, and being formed with a shank 2ª which fits squarely against the inner surface of the rim 7. Projecting rearwardly from the shank 2ª is a longitudinally disposed sleeve 9 through which the clamping bolt 3 extends, said sleeve 9 being located at the outer end of the claw 2 so that the extremity thereof provides a seat against which the head 10 of the clamping screw 3 bears when the clamping screw is tightened to draw the spare tires firmly together. This head 10 is in the form of a finger piece which can be conveniently grasped by the fingers when screwing or unscrewing the bolt, and one side of the head at the base thereof is provided with a laterally projecting eye 11 adapted to be rotated into registry with a perforated ear 12 projecting from the end of the sleeve 9. The shackle of an ordinary padlock 13 can then be inserted through the eye 11 and ear 12 so as to prevent tampering with the tire holder and render theft of the second spare tire practically impossible.

The device may be employed for connecting a second spare tire to the rim of a first spare tire, regardless of the particular construction of tire holder which is employed for supporting the first spare tire in position. In Fig. 1 the first spare tire 5 is shown as mounted at the rear end of the automobile body upon a conventional form of support 14, while in Fig. 2 the first spare tire 5 is shown as mounted upon the running board 15 by an ordinary form of tire holder 16. The second spare tire 8 is mounted upon the rim of the first spare tire and clamped tightly against the first spare tire so that it is held securely in position and there is no looseness or play to cause rattling. The use of the padlock 13 renders it impossible for the second spare tire to be stolen or for the clamping screw to work loose, although the spare tire can be readily removed at any time when it may be desired to use the same. When there is no occasion to carry a second spare tire the clamping members can be easily carried in the tool box, as they occupy but a small amount of space.

While I have chosen to illustrate my invention as applied to demountable rims carrying spare tires, it is obvious that my invention may to equal advantage be used for supporting demountable wheels carrying spare tires, and when so used the clamping devices straddle the wheel fellies between the spokes thereof and coöperate with the rims or fellies, as desired.

While I have illustrated one specific form of clamping device in which my invention may find embodiment I do not wish to be limited to the exact details of construction so illustrated and described as changes may be resorted to without departing from the spirit and scope of my invention, as defined by the appended claims.

Having thus described the invention, what I claim as new and desire to secure by Letters Patent, is:—

1. A device for supporting a second spare tire from the rim of a first spare tire, including clamping means for engaging the rims only of the tires and fastening them together, and locking means for holding the clamping means in position.

2. A device for supporting a second spare tire from the rim of a first spare tire, including complemental clamping claws adapted to engage the rims of the two tires, a member adjustably connecting the clamping claws, and locking means coöperating with the member to prevent theft of the tire.

3. A device for supporting a second spare tire from the rim of a first spare tire, including complemental clamping claws adapted to engage the rims of the two tires, and formed with sleeves one of which is internally threaded, and a member extending through the sleeves and threaded for coöperation with the internally threaded sleeve to draw the two tires tightly together.

4. A device for supporting a second spare tire from the rim of a first spare tire, including coöperating clamping claws adapted to engage the rims of the two tires and provided with sleeves, a bolt member extending through the sleeves, said bolt member having a threaded engagement with one of the sleeves and terminating in a head which bears against the opposite sleeve, and locking means to prevent the bolt member from working loose.

5. A device for supporting a second spare tire from the rim of a first spare tire, including coöperating clamping claws constructed to engage the rims of the two tires and formed with shanks fitting against the inner surfaces of the rims, each of the shanks being provided with an outstanding sleeve one of which is internally threaded while the opposite sleeve is provided at the outer end thereof with a perforated ear, a bolt member passing through the sleeves and having one end thereof in engagement with the interiorly threaded sleeve while the opposite end thereof terminates in a head which bears against the end of the other sleeve, said head being formed with an eye adapted to be rotated into registry with the perforated ear of the sleeve, and a padlock adapted to engage the eye and perforated ear to lock the bolt against working loose.

WILLIAM P. HAMMOND.